(12) United States Patent
Angerfors

(10) Patent No.: US 6,360,859 B1
(45) Date of Patent: *Mar. 26, 2002

(54) DEVICE AND METHOD IN BRAKING SYSTEMS FOR MOTOR VEHICLES

(75) Inventor: Dan Angerfors, Floda (SE)

(73) Assignee: AB Volvo (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/171,176
(22) PCT Filed: Apr. 15, 1997
(86) PCT No.: PCT/SE97/00640
§ 371 Date: Apr. 28, 1999
§ 102(e) Date: Apr. 28, 1999
(87) PCT Pub. No.: WO97/38883
PCT Pub. Date: Oct. 23, 1997

(30) Foreign Application Priority Data

Apr. 15, 1996 (SE) .............................. 9601419

(51) Int. Cl.⁷ .............................................. F16D 51/00
(52) U.S. Cl. ........................ 188/330; 188/329; 74/102
(58) Field of Search ............................ 188/79.55, 330, 188/329, 196 V; 74/102, 105, 99 R; 403/79, 157

(56) References Cited

U.S. PATENT DOCUMENTS

| 2,188,952 | A | * | 2/1940 | Leighton | 403/79 |
| 2,480,958 | A | * | 9/1949 | Pietzsch | 403/79 |
| 3,554,587 | A | * | 1/1971 | Baker | 403/157 |
| 3,980,159 | A | * | 9/1976 | Baxendale | 188/72.7 |
| 4,015,692 | A | * | 4/1977 | Mathews | 188/79.55 |
| 5,036,958 | A | | 8/1991 | Yamamoto | |
| 5,184,701 | A | | 2/1993 | Mamery | |
| 5,312,199 | A | * | 5/1994 | Smith, Jr. | 403/79 |
| 5,320,198 | A | | 6/1994 | Hoyt et al. | |

* cited by examiner

Primary Examiner—Robert J. Oberleitner
Assistant Examiner—Robert A. Siconolfi
(74) Attorney, Agent, or Firm—Lerner, David, Littenberg, Krumholz & Mentlik, LLP

(57) ABSTRACT

Brake systems are disclosed for use in motor vehicles comprising a brake cylinder including a push rod, a brake key for activating a wheel brake on the motor vehicle, a braking lever having a first end for connection to the brake key and a second end for connection to the push rod, and a mount affixed to the push rod between the brake cylinder and the end of the push rod, the mount including a predetermined shape such as a pin and the braking lever including a predetermined shape such as an aperture so that the mount can be coupled to the push rod at a location between the brake cylinder and the end of the push rod by attaching the pin to the aperture. Methods for mounting brake systems in motor vehicles are also disclosed.

16 Claims, 4 Drawing Sheets

DEVICE AND METHOD IN BRAKING SYSTEMS FOR MOTOR VEHICLES

FIELD OF THE INVENTION

The present invention relates to a device utilized in braking systems for motor vehicles. More particularly, the present invention has its main application in connection with braking systems for commercial vehicles. Still more particularly, the present invention relates to a method for mounting such a braking system on a motor vehicle.

BACKGROUND OF THE INVENTION

Larger motor vehicles, e.g. commercial vehicles, are presently designed with lower and lower ground clearances. A primary reason for this is the need to maximize the available cargo space in the vehicle. Since the maximum cargo space is limited by the maximum height allowed and the height of the vehicle chassis, there is consequently a desire to reduce the height of the chassis in order to thereby increase the cargo space. At the same time, maximum ground clearance is desired in order to avoid damage to the vehicle when driving over rough ground. The demands of low height of the chassis and large ground clearance in turn set limitations when designing the braking system of the commercial vehicle. This is particularly true in the case where the braking system comprises a compressed-air driven brake cylinder, which may be mounted standing in a given position in relation to a wheel shaft, and when the brake cylinder comprises a substantially vertically projecting push rod. With such a construction, the height of the chassis of the vehicle is limited by the length of the push rod.

It is known in the prior art that the end of the push rod, which protrudes from the brake cylinder, is normally threaded and connected to a brake key by means of a special lever member.

When the braking system is activated by the driver of the vehicle, the push rod is pressed out from the brake cylinder, thereby influencing the brake key by means of the lever. The brake key, in turn, activates the wheel brake.

With reference to FIG. 1, a previously known system of the above-mentioned kind will be described. FIG. 1 shows a brake cylinder 1, intended to be mounted on a wheel shaft in a commercial vehicle. The brake cylinder 1 comprises a push rod 2, which is pressed out essentially in a vertical direction (i.e., downwards in the drawing) when the braking system is activated by the driver of the vehicle. The movement of the push rod 2 is transferred to a brake key 3 by means of a braking lever 4. The brake key 3 is arranged substantially parallel to the wheel shaft which is to be braked.

When mounting this previously known device, i.e. when the braking lever 4 is to be mounted in order to join the push rod 2 to the brake key 3, the brake cylinder 1 and the brake key 3 have to be pre-installed, i.e. they are placed in the vehicle in advance. In this way, installation of the lever 4 may be accomplished by mounting one end of lever 4, comprising an aperture 5 with internal splines, onto outer splines 6 on the brake key 3. The spline separation which is utilized in this spline coupling will cause the opposite end of the lever 4 to be positioned adjacent to the push rod 2 in a position which may vary within a certain interval in relation to the end of the push rod 4. The exact position for the end of the lever 4 is determined by the fixed spline separation and the length of the lever 4. The splined coupling 5, 6 is thereafter locked by means of a locking screw 7 with appurtenant nut 8.

The next step in the mounting operation is that a link element, consisting of two link members 9 and 10, respectively, is brought together on both sides of the push rod 2 and the end of the lever 4, which has been placed adjacent to the push rod 2. The first link member 9 is joined to the second link member 10 by means of two screws, 11 and 12, which are inserted into corresponding holes, 13 and 14, in the second link member 10, while a pin 15 in the first link member 9 is passed through a hole 16 in the lever 4 and into a further hole 17 in the second link member 10. Thereafter, the link element 9, 10 is screwed on by means of the screws, 11 and 12, and nuts, 18 and 19. The link members, 9 and 10, further comprise internal threads 20 (which are only evident from the link member 10 in FIG. 1) which interact with threads 21 on the push rod 2. In this way, the push rod 2 may be locked to the link elements 9, 10 and transfer its movement to the brake key 3 by means of the lever 4.

As mentioned above, the spline separation of the splined coupling 5, 6 implies that the end portion of the lever 4 facing towards the push rod 2 will be positioned in a position which may vary vertically within a certain interval. This interval is normally of the magnitude of approx. 30 mm. Thus, the length of the link element 9, 10 cannot be below this interval, since it has to be utilized for bridging the distance between the push rod 2 and the lever 4. The fact that the interval must be accomodated by the link element 9, 10, in its turn, means that this has to project downwards a relatively long distance below the push rod 2. This constitutes a disadvantage, since it creates an essential limitation when the ground clearance and the height of the chassis of the vehicles are concerned.

SUMMARY OF THE INVENTION

A main object of the present invention is to achieve an improved device for joining a push rod and a brake key in a braking system, particularly for commercial vehicles, which braking system utilizes a compressed-air driven brake cylinder with a vertically projecting push rod. In particular, it is an object of the present invention to create conditions for optimizing the relation between the ground clearance and the height of the chassis of the vehicle.

A further object of the invention is to provide a simplified mounting of a braking system for a commercial vehicle, having a minimum number of components and working steps in the mounting operation.

In accordance with the present invention, these and other objects have now been realized by the invention of brake system for use in motor vehicles comprising a brake cylinder including a push rod having an end portion projecting from the brake cylinder upon activation of the brake cylinder, a brake key for activating a wheel brake on the motor vehicle, a braking lever including a first end and a second end, the first end of the braking lever adapted for connection to the brake key and the second end of the braking lever adapted for connection to the push rod, and a mounting member affixed to the push rod at a location between the brake cylinder and the end of the push rod, the mounting member including a first attachment member and the braking lever including a second attachment member whereby the braking lever can be coupled to the push rod at a location between the brake cylinder and the end of the push rod by attaching the first and second attachment members to each other. In accordance with one embodiment of the brake system of the present invention, the first attachment member comprises a predetermined shape of the mounting member and the second attachment member comprises a predetermined complementary shape of the braking lever. In a preferred embodiment, the predetermined shape of the mounting member comprises a pin and the predetermined complementary shape of the braking lever comprises an aperture.

In accordance with one embodiment of the brake system of the present invention, the push rod includes external threads and the mounting member comprises a substantially sleeve-shaped member including internal threads adapted to mate with the external threads of the push rod.

In accordance with another embodiment of the brake system of the present invention, the system includes a support including a first end and a second end, the first end of the support adapted for connection to the mounting member and the second end of the support adapted for connection to the braking lever. In a preferred embodiment, the mounting member includes a third attachment member and the first end of the support includes a fourth attachment member. More preferably, the third attachment member comprises a predetermined shape of the mounting member and the fourth attachment member comprises a predetermined complementary shape of the support. Most preferably, the predetermined shape of the mounting member comprises a pin and the predetermined complementary shape of the support comprises an aperture.

In accordance with another embodiment of the brake system of the present invention, the first end of the braking lever is adapted for connection to the brake key by means of a splined coupling.

In accordance with the method of the present invention, a method has been developed for mounting a brake system in a motor vehicle, the brake system comprising a brake cylinder including a push rod having an end portion projecting from the brake cylinder upon activation of the brake cylinder and a brake key for activating a wheel brake on the motor vehicle, the method comprising mounting a mounting member on the push rod at a location between the brake cylinder and the end of the push rod, providing a braking lever having a first end and a second end, connecting the second end of the braking lever to the mounting member at the location between the brake cylinder and the end of the push rod, and connecting the second end of the braking lever to the brake key in a direction substantially parallel to the longitudinal direction of the brake key. In a preferred embodiment, the mounting member includes a first attachment member having a predetermined shape integral therewith and the second end of the braking lever includes a second attachment member having a predetermined complementary shape integral therewith, the method further comprising connecting the second end of the braking lever to the mounting member by guiding the predetermined shape of the mounting member into the predetermined complementary shape of the second end of the braking lever.

In accordance with one embodiment of the method of the present invention, the method includes separately connecting the mounting member to the braking lever by means of a separate support.

The present invention is based on a mounting device which, together with the braking lever, comprises means for coupling the push rod to the braking lever, by means of the mounting device, at a point which is situated within the end of the push rod which projects from the brake cylinder. In this way, the only limitation for the height of the chassis/ground clearance is given by the length of the push rod, i.e. the distance between the brake cylinder and the lever may be made shorter than in previously known devices.

According to a preferred embodiment of the present invention, the push rod may be coupled to the lever by means of the mounting device since the mounting device comprises a modification of shape, preferably in the form of a pin, which interacts with a corresponding modification of shape, preferably a hole, which has been provided in the braking lever.

BRIEF DESCRIPTION OF THE DRAWINGS

In the following detailed description, the invention will be described in greater detail with reference to the attached drawings, in which.

DETAILED DESCRIPTION

Figure 1:
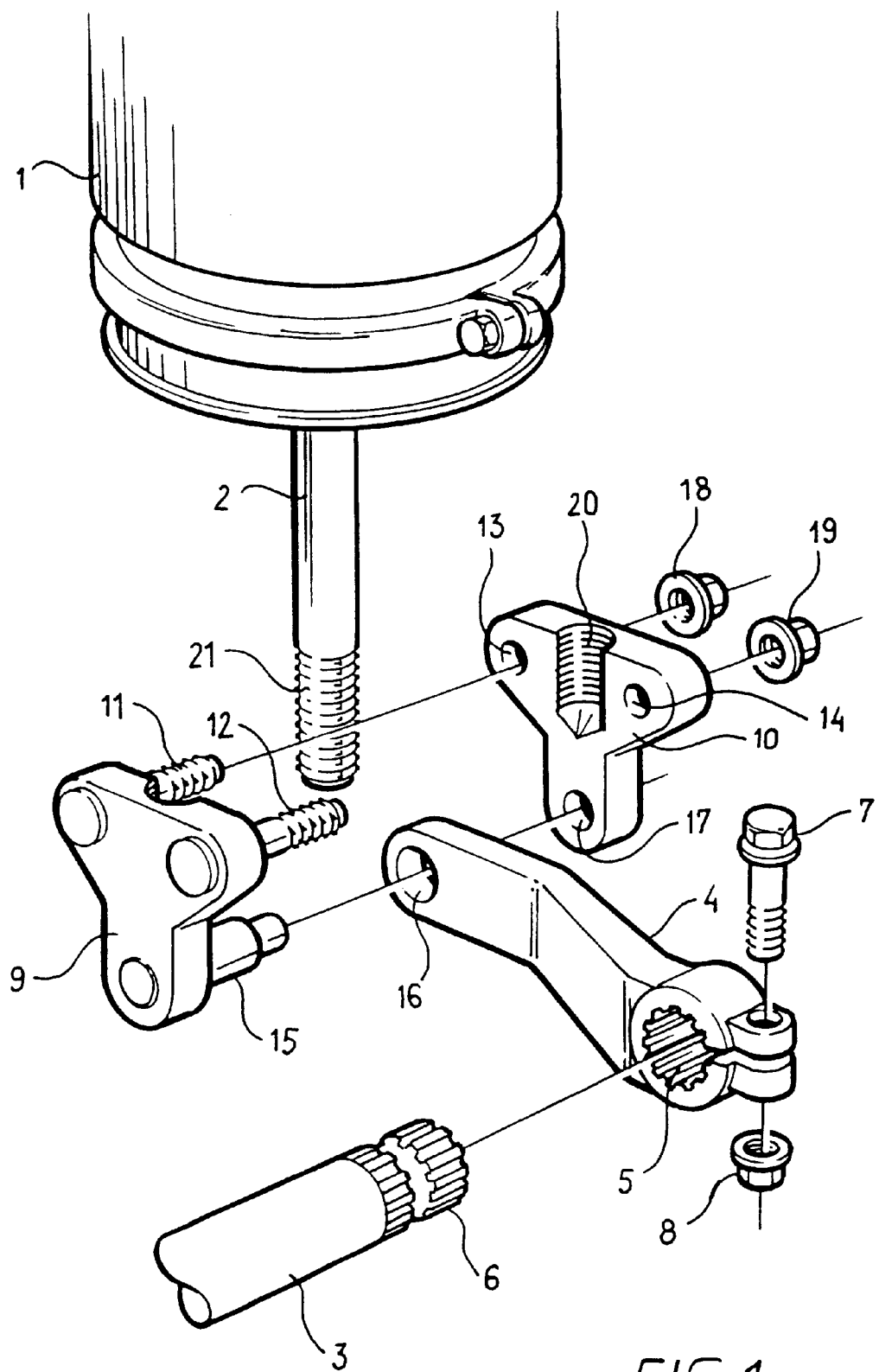
FIG. 1 is a front, exploded, perspective view of a known device in a braking system.
Figure 2:
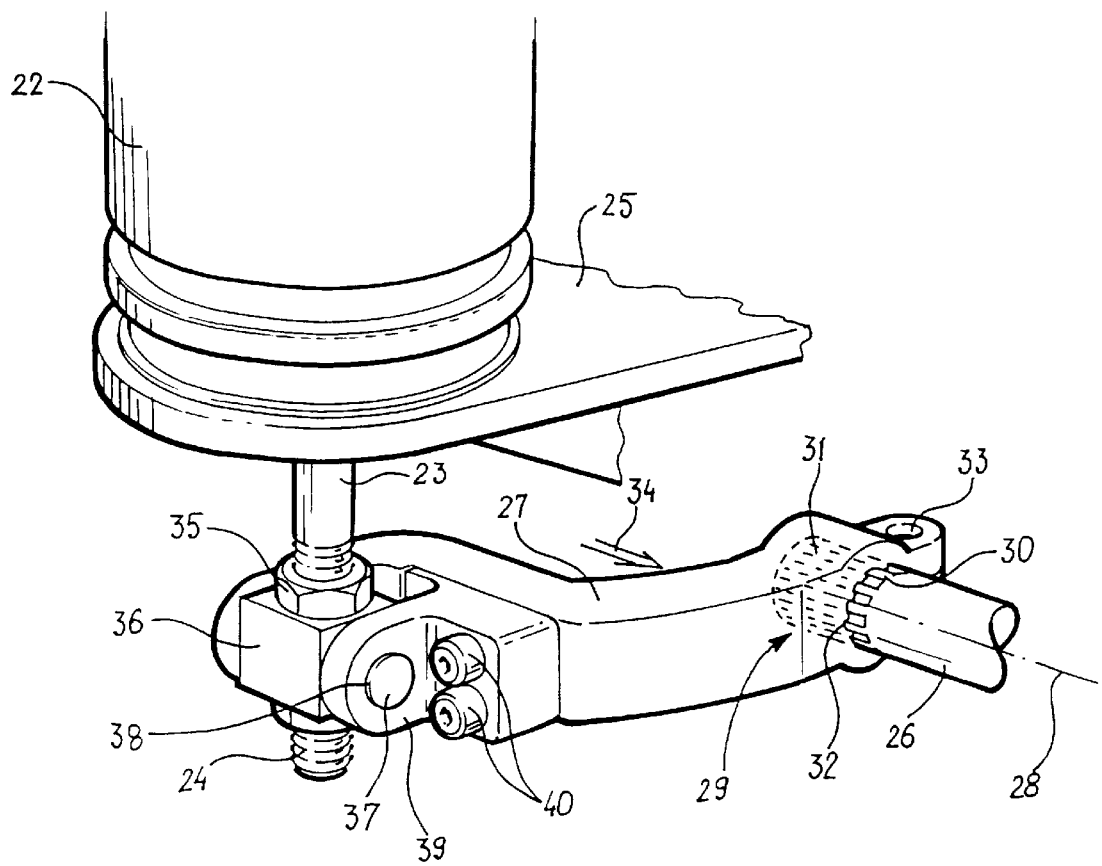
FIG. 2 is a front, perspective view of a device in a braking system according to the present invention.

Referring to the drawings, FIG. 2 is a perspective view of a device in accordance with the present invention which, according to a preferred embodiment, is utilized in connection with a braking system for a commercial vehicle. The drawing shows the device in its mounted state. The braking system comprises a compressed-air driven brake cylinder 22, of a previously known type, which may be influenced by the driver of the vehicle when braking. The brake cylinder 22 comprises a push rod 23, the lower end of which is provided with external threads 24. According to this embodiment, the brake cylinder 22 is mounted standing up by means of an attachment bracket 25, which is firmly affixed to the vehicle. The brake cylinder 22 may be mounted with an extension substantially in the vertical direction, or with another orientation.

The push rod 23 is known to be arranged to be pushed out from the brake cylinder 22 when the braking system is activated. In this manner, the movements of the push rod 23 are transferred to a brake key 26 by means of a braking lever 27. The brake key 26, in turn, is connected to a (not shown) wheel brake. The brake key 26 is preferably oriented with an extension which runs along an axis 28 which is substantially parallel to the wheel shaft of the vehicle, which supports the wheel which is to be braked.

The lever 27 and the brake key 26 may be connected by means of a splined coupling 29, which is formed by external splines 30 on the brake key 26, and internal splines 31 arranged in a hole 32 at one end of the lever 27. The hole 32 is slotted, whereby the splined coupling 29 may be clamped by means of a locking screw 33, interacting with a (not shown) nut on the underside of the right end portion of the lever 27.

When mounting the device, it is required that the brake cylinder 22 and the appurtenant push rod 23 have been pre-mounted and are in position. Furthermore, the brake key 26 is pre-mounted. For this reason, the lever 27 must be brought into position in the direction which is marked with an arrow 34 in FIG. 2, i.e. in a direction which is essentially parallel to the axis 28. Before the lever 27 is brought into position, however, in accordance with the present invention, a special mounting device, in the form of a cross 35, is mounted on the push rod 23. As will become evident by the discussion below, the cross 35 is composed of a sleeve-shaped element which is provided with internal threads, interacting with the threads 24 on the push rod 23. Furthermore, the cross 35 comprises an intermediate portion 36, having a square (optionally rectangular) cross-section and which is provided with two pins, out of which a first pin is intended to project through a hole in the lever 27 (not evident from FIG. 2), and a second pin 37 is intended to project through a hole 38 which has been tooled into a separate supporting member 39. This supporting member 39 may, in turn, be mounted to the lever 27 by tightening two screws 40 which interact with corresponding holes in the lever 27.

Figure 3:
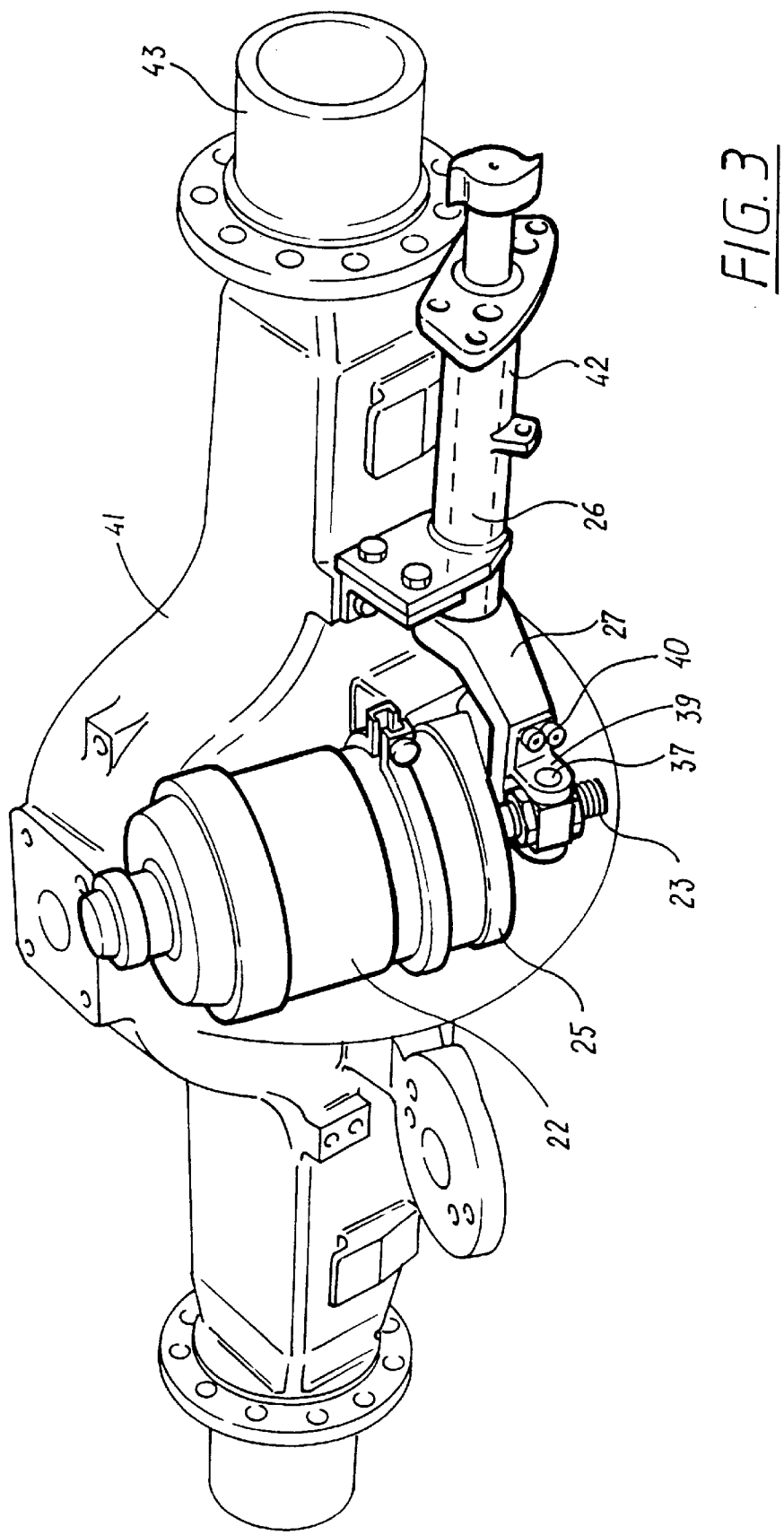
FIG. 3 is a side, perspective view of a rear axle in which the present invention may be utilized.

In FIG. 3, a rear axle 41 for a commercial vehicle is shown, for which the invention has its main application. The location of the brake cylinder 22 on the bracket 25 is evident from the drawing. The brake cylinder 22 is arranged such that the push rod 23, when activated, can project a certain distance from the brake cylinder 22. Furthermore, the push rod 23 is connected to the braking lever 27 by means of the supporting member 39. The brake key 26 runs inside a brake key cover 42 comprising an opening which emerges where the braking device of the rear axle 41 (not shown) is arranged, i.e. in connection to a wheel shaft 43.

Figure 4A:
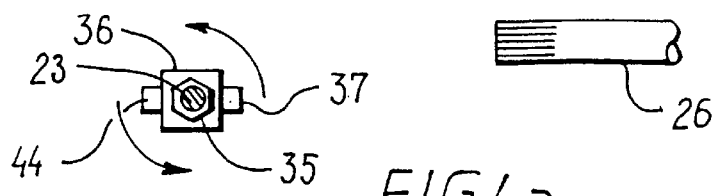
FIG. 4a is a top, elevational view showing the relationship between the push rod and the brake key prior to mounting the device according to the present invention.
Figure 4B:
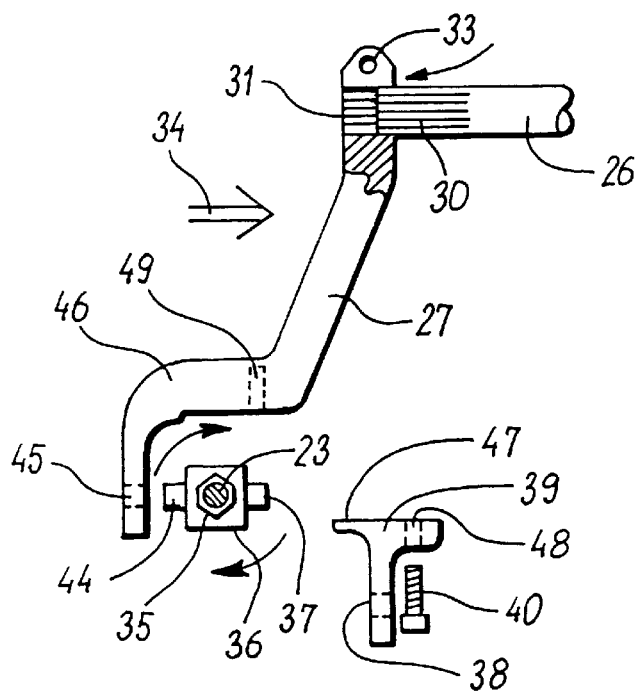
FIG. 4b is a side, elevational view of the braking lever during mounting the device according to the present invention.
Figure 4C:
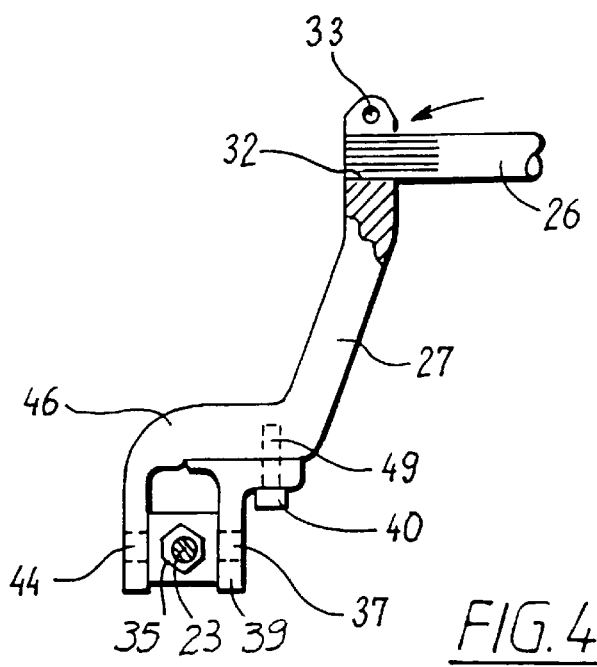
FIG. 4c is a side, elevational view of the device according to the present invention after mounting.

In FIGS. 4a–4c, the procedure for mounting the device in accordance with the present invention is illustrated. FIG. 4a shows the initial position, whereby the push rod 23 is shown in cross section, and the brake key 26 is arranged in a certain predetermined position in relation to the push rod 23. Firstly, the cross 35 is screwed upwards a certain distance on the push rod 23. It can therefore be seen that the pins, 37 and 44, on the intermediate section 36 of the cross 35 are directed substantially parallel to the brake key 26. As is evident from FIG. 4b, the braking lever 27 is thereafter mounted substantially parallel to the direction in which the brake key 26 has its extension. The mounting direction is indicated by the arrow 34. When mounting, it is ensured that the hole 32 in one end of the lever 27 is brought inwards over the brake key 26 so that the external splines 30, which are located on the brake key 26, come into contact with the internal splines 31 located in the hole 32. Furthermore, it is ensured that the pin 44 is aligned with the pin hole 45 in the lever 27. If a fine adjustment of the position of the cross 35 along the push rod 22 is necessary, this is achieved by screwing the cross 35 a number of turns upwards or downwards.

The lever 27 is curved in such a way that it comprises an intermediate portion 46, the extension of which is mainly parallel to the brake key 26. In this way it is possible for the location of the pin hole 45 to be slightly displaced in the direction along the length thereof in relation to the hole 32 in the opposite end of the lever 27. This, in turn, implies that the lever 27, may be brought a small distance over the brake key 26, while the cross 35 still may be turned in order to be finely adjusted. This facilitates mounting of the lever 27.

The construction of the above-mentioned supporting member 39, comprising a planar support surface 47 for contacting the intermediate portion 46 of the lever 27, is also evident from FIG. 4b. As mentioned above, the supporting member 39 additionally comprises a pin hole 38 arranged to interact with the pin 37. Furthermore, the supporting member 39 comprises two holes 48 (of which only one is evident from FIG. 4b), intended for the through screws 40, which are screwed into the corresponding holes in the lever 27. In FIG. 4c, the device is shown in its mounted state, whereby the cross 35 has been adjusted into the correct position and its pins 37 and 44 have been fitted into the lever 27 and the supporting member 39, respectively. When the lever 27 is then pushed completely into position on the brake key 26, the splined coupling 29 is locked by means of tightening the fastening screw 33. Finally, the supporting member 39 is locked by means of the screws 40.

By means of the present invention, it is ensured that the end portion of the lever 27, facing the push rod 23, is positioned so that it is connected to the cross 35 at a point which lies within the end of the push rod 23 which projects from the brake cylinder. In the case where the brake cylinder is mounted vertically, this accordingly implies that this point is situated above the lower end of the push rod 23 (cf. FIG. 2). This means that no unnecessary extension of the push rod 23 is required. Instead, it is the maximum length of the push rod 23 which sets the limit to the height of the chassis and the ground clearance of the vehicle.

The present invention is not limited to the above-mentioned embodiment, but may be varied within the scope of the subsequent claims. The intermediate portion 46 of the lever 27 may, for instance, be adapted in length according to an existing mutual distance between the push rod 23 and the brake key 26. Furthermore, the cross 35 may be provided with small holes which interact with pins in the lever and the supporting member, instead of the reverse thereof.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A brake system for use in motor vehicles comprising a brake cylinder including a push rod projecting from said brake cylinder, said push rod having a lower end movable away from said brake cylinder upon activation of said brake cylinder, a brake key for activating a wheel brake on said motor vehicle, a braking lever including a first end and a second end, said first end of said braking lever adapted for connection to said brake key and said second end of said braking lever adapted for connection to said push rod, and a mounting member affixed to said push rod at a location above the lower end of said push rod so that the lower end of said push rod extends below said mounting member, said mounting member including a first attachment member and said braking lever including a second attachment member whereby said braking lever can be coupled to said push rod at a location between said brake cylinder and said lower end of said push rod by attaching said first and second attachment members to each other.

2. The brake system of claim 1 wherein said first attachment member comprises a predetermined shape of said mounting member and said second attachment member comprises a predetermined complementary shape of said braking lever.

3. The brake system of claim 2 wherein said predetermined shape of said mounting member comprises a pin and said predetermined complementary shape of said braking lever comprises an aperture.

4. The brake system of claim 1 wherein said push rod includes external threads and said mounting member comprises a substantially sleeve-shaped member including internal threads adapted to mate with said external threads of said push rod.

5. The brake system of claim 1 including a support including a first end and a second end, said first end of said support adapted for connection to said mounting member and said second end of said support adapted for connection to said braking lever.

6. The brake system of claim 5 wherein said mounting member includes a third attachment member and said first end of said support includes a fourth attachment member.

7. The brake system of claim 6 wherein said third attachment member comprises a predetermined shape of said mounting member and said fourth attachment member comprises a predetermined complementary shape of said support.

8. The brake system of claim 7 wherein said predetermined shape of said mounting member comprises a pin and said predetermined complementary shape of said support comprises an aperture.

9. The brake system of claim 1 wherein said first end of said braking lever is adapted for connection to said brake key by means of a splined coupling.

10. A method for mounting a brake system in a motor vehicle, said brake system comprising a brake cylinder including a push rod projecting from said brake cylinder, said push rod having a lower end movable away from said brake cylinder upon activation of said brake cylinder and a brake key for activating a wheel brake on said motor vehicle, said method comprising mounting a mounting member on said push rod at a location above said lower end of said push rod so that the lower end of said push rod extends below said mounting member, providing a braking lever having a first end and a second end, connecting said second end of said braking lever to said mounting member at said location above said lower end of said push rod, and connecting said second end of said braking lever to said brake key in a direction substantially parallel to the longitudinal direction of said brake key.

11. The method of claim 10 wherein said mounting member includes a first attachment member having a predetermined shape integral therewith and said second end of said braking lever includes a second attachment member having a predetermined complementary shape integral therewith, said method further comprising connecting said second end of said braking lever to said mounting member by guiding said predetermined shape of said mounting member into said predetermined complementary shape of said second end of said braking lever.

12. The method of claim 10 including separately connecting said mounting member to said braking lever by means of a separate support.

13. A method of mounting a brake system in a motor vehicle having a premounted rod, cylinder and brake key mounted to the vehicle, the brake key having an end to be coupled to the rod, comprising:

a) attaching a mounting member to the rod at a location above a lower end of the rod so that said mounting member is located between the lower end of the rod and the cylinder and so that the lower end of said push rod extends below said mounting member, the mounting member having a first attachment member;

b) providing a lever having a first end for attachment to the end of the brake key and a second end having a second attachment member;

c) bringing into position the lever toward the end of the brake key, after the mounting member is attached to the rod, so that the first attachment member is attached to the second attachment member and the first end of the lever is attached to the end of the brake key;

d) attaching a supporting member to the lever and the mounting member.

14. The method of claim 13, wherein the mounting member has a first side and a second side opposite the first side, the second attachment member is attached to the first attachment member at the first side, and the supporting member is attached to the mounting member at the second side.

15. The method of claim 13, wherein the lever is curved and has an intermediate portion so that the first end of the lever is offset in relation to the second end of the lever.

16. The method of claim 15, wherein the lever is brought into position so that the first end of the lever is attached to the brake key before the first attachment member is attached to the second attachment member.

* * * * *